(12) United States Patent
Fritz et al.

(10) Patent No.: US 9,748,538 B2
(45) Date of Patent: Aug. 29, 2017

(54) MOTOR VEHICLE BATTERY

(71) Applicants: Dr. Ing. h.c. F. Porsche Aktiengesellschaft, Stuttgart (DE); Samsung SDI Co., Ltd., Yongin-si, Gyeonggi-do (KR); Robert Bosch GmbH, Stuttgart (DE)

(72) Inventors: Thomas Fritz, Loechgau (DE); Alexander Klausmann, Schoenaich (DE); Klaus Wipfler, Niefern-Oeschelbronn (DE); Claus Gerald Pflueger, Markgroeningen (DE); Roland Wiest, Stuttgart (DE)

(73) Assignees: Dr. Ing. h.c. F. Porsche Aktiengesellschaft, Stuttgart (DE); Robert Bosch GmbH, Stuttgart (DE); Samsung SDI Co., Ltd., Yongin-si (KR)

( * ) Notice: Subject to any disclaimer, the term of this patent is extended or adjusted under 35 U.S.C. 154(b) by 490 days.

(21) Appl. No.: 13/961,071

(22) Filed: Aug. 7, 2013

(65) Prior Publication Data
US 2014/0045026 A1 Feb. 13, 2014

(30) Foreign Application Priority Data
Aug. 10, 2012 (DE) .................. 10 2012 015 818

(51) Int. Cl.
*H01M 2/10* (2006.01)
*B60L 11/18* (2006.01)

(52) U.S. Cl.
CPC ....... *H01M 2/1077* (2013.01); *B60L 11/1864* (2013.01); *B60L 11/1874* (2013.01);
(Continued)

(58) Field of Classification Search
CPC ............ H01M 2/1077; H01M 2/1083; H01M 2220/20; B06L 11/1879; B06L 11/1874;
(Continued)

(56) References Cited

U.S. PATENT DOCUMENTS 4,278,742 A  7/1981 Oxenreider et al.
4,699,855 A * 10/1987 Abraham ............ H01M 2/1072
                                                           429/122

(Continued)

FOREIGN PATENT DOCUMENTS

CN       201011660 Y    1/2008
CN       101521269      9/2009
(Continued)

OTHER PUBLICATIONS

German Search Report of Feb. 20, 2013.
(Continued)

*Primary Examiner* — Emily Le
*Assistant Examiner* — Lilia V Nedialkova
(74) *Attorney, Agent, or Firm* — Gerald E. Hespos; Michael J. Porco; Matthew T. Hespos (57) ABSTRACT

A motor vehicle battery has a plurality of battery modules (12). Each battery module (12) is fastened to housing walls (15) of a battery housing (11). The battery housing (11) has at least two housing modules (17, 18) positioned above one another and formed with housing module walls (19, 20). At least some of the mutually adjoining housing module walls (19, 20) interengage in the manner of toothing to form the housing walls (15, 16).

17 Claims, 5 Drawing Sheets

(52) U.S. Cl.
CPC ....... *B60L 11/1879* (2013.01); *H01M 2/1083* (2013.01); *H01M 2220/20* (2013.01); *Y02T 10/7005* (2013.01); *Y02T 10/7061* (2013.01)

(58) Field of Classification Search
CPC .............. B06L 11/1864; B60L 11/1879; B60L 11/1874; B60L 11/1864; Y02T 10/7005; Y02T 10/7061
USPC ............ 429/99–100, 153, 163, 177, 183, 18
See application file for complete search history.

(56) References Cited

U.S. PATENT DOCUMENTS

| | | | | |
|---|---|---|---|---|
| 5,034,290 | A * | 7/1991 | Sands | H01M 2/1088 429/120 |
| 5,403,679 | A | 4/1995 | Stone | |
| 5,981,101 | A | 11/1999 | Stone | |
| 6,451,475 | B1 | 9/2002 | Sherwood | |
| 7,507,499 | B2 | 3/2009 | Zhou et al. | |
| 7,744,161 | B2 * | 6/2010 | Berg | A47C 4/021 297/440.13 |
| 2008/0160395 | A1 * | 7/2008 | Okada | B60L 3/0046 429/99 |
| 2011/0256446 | A1 * | 10/2011 | Bronczyk | H01M 2/1077 429/163 |
| 2013/0207459 | A1 * | 8/2013 | Schroder | H01M 2/1077 307/10.1 |

FOREIGN PATENT DOCUMENTS

| | | | | |
|---|---|---|---|---|
| ES | DE 3523526 | A1 * | 2/1986 | .......... H01M 2/1072 |
| JP | 200748637 | A | 2/2007 | |
| WO | 2008/035872 | | 3/2008 | |

OTHER PUBLICATIONS

Chinese Office Action in Application No . 2013103395982, dated Jul. 14, 2016.
Japanese Office Action and Translation dated May 31, 2017.

* cited by examiner

MOTOR VEHICLE BATTERY

CROSS REFERENCE TO RELATED APPLICATIONS

This application claims priority under 35 USC 119 to German Patent Appl. No. 10 2012 015 818.1 filed on Aug. 10, 2012, the entire disclosure of which is incorporated herein by reference.

BACKGROUND

1. Field of the Invention

The invention relates to a motor vehicle battery.

2. Description of the Related Art

Motor vehicle batteries that are used as an energy accumulator or traction battery in hybrid vehicles or electric vehicles typically have a plurality of battery modules, and each battery module has a plurality of battery cells. The battery modules of the motor vehicle battery are fastened to housing walls of a battery housing. Simple manufacture of the motor vehicle battery is difficult particularly when a plurality of layers of battery modules positioned next to one another are arranged one above another in a motor vehicle battery.

An object of the invention is to provide a novel motor vehicle battery.

SUMMARY OF THE INVENTION

The invention relates to a battery housing that has at least two housing modules positioned one above another. The housing modules have mutually adjoining housing module walls that interengage in the manner of toothing to form the housing walls. This construction allows simple manufacture of the motor vehicle battery.

The interengaging housing module walls preferably interengage in the manner of toothing so that projections of a housing module wall of a housing module engage in cutouts of a housing module wall of an adjoining housing module. Thus, the interengaging housing module walls can be produced simply.

The housing module walls that interengage in the manner of toothing may form a W-like or E-like housing structure that is delimited at open ends by further housing module walls. This housing structure can be produced simply and allows individual battery modules of the motor vehicle battery to be accommodated securely.

The housing module walls that interengage in the manner of toothing may be connected to one another via clamping bars. The connection via clamping bars is simple and therefore preferred in many embodiments.

Without being limited, exemplary embodiments of the invention will be explained in greater detail with reference to the drawings.

DETAILED DESCRIPTION OF THE PREFERRED EMBODIMENTS

The invention relates to a motor vehicle battery that is used as a traction battery or as an electric energy accumulator in a hybrid vehicle or electric vehicle. The motor vehicle battery can be discharged during motor operation of an electrical machine of the motor vehicle and charged during the generator operation.

Figure 1:
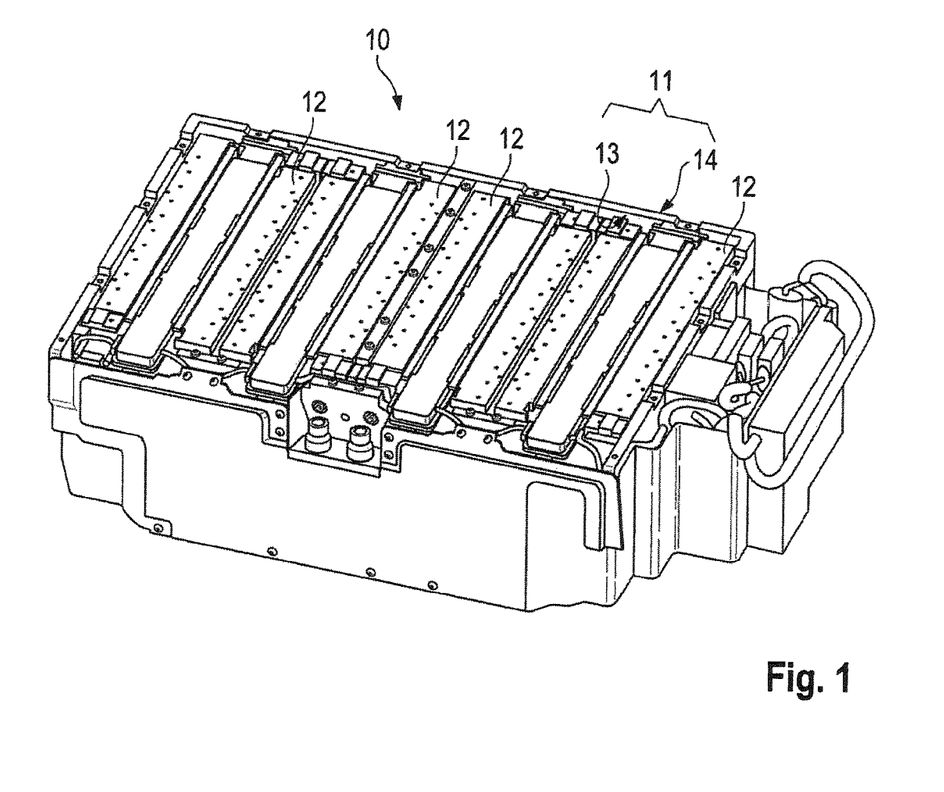
FIG. 1 is a perspective view of a motor vehicle battery.

FIG. 1 is a perspective view of a partially opened motor vehicle battery 10. The motor vehicle battery 10 comprises a housing 11 in which a plurality of battery modules 12 are accommodated in layers positioned above one another. Each layer has four battery modules 12 and each battery module 12 has a plurality of individual battery cells, which are not shown in detail.

The layers of battery modules 12 are accommodated in the battery housing 11, which, in this exemplary embodiment, is formed by an inner housing 13 and an outer housing 14. If appropriate, the outer housing 14 can be dispensed with, in which case the housing 11 is formed exclusively by the inner housing 13.

The individual battery modules 12 of the motor vehicle battery 10 are fastened to housing walls 15 of the inner housing 13 of the battery housing 11. The housing walls 15 to which the individual battery modules 12 are fastened extend transversely with respect to the longitudinal direction of a motor vehicle when the motor vehicle battery 10 is in the assembled state.

Further housing walls 16 extend in the longitudinal direction of the motor vehicle and, together with the housing walls 15, define the inner housing 13 of the battery housing 11. In the exemplary embodiment shown, a total of three housing walls 16 are present and extend in the longitudinal direction of the motor vehicle.

The battery housing 11 has at least two housing modules 17 and 18 positioned above one another. The preferred exemplary embodiment of the motor vehicle battery 10 has two layers of battery modules 12 positioned next to one another in the housing modules 17 and 18 of the battery housing 11 that are positioned above one another. Each of the housing modules 17 and 18 accommodates a layer of battery modules 12 positioned next to one another.

Each housing module 17, 18 of the inner housing 13 of the battery housing 11 has housing module walls 19 and 20. The housing module walls 19, 20 are positioned above one another to form the housing walls 15, 16 of the inner housing 13 of the battery housing 11. At least some of the mutually adjoining housing module walls 19, 20 of the housing modules 17, 18 interengage in the manner of toothing to form the housing walls 15, 16 when the housing modules 17, 18 are positioned above one another.

Figure 2:
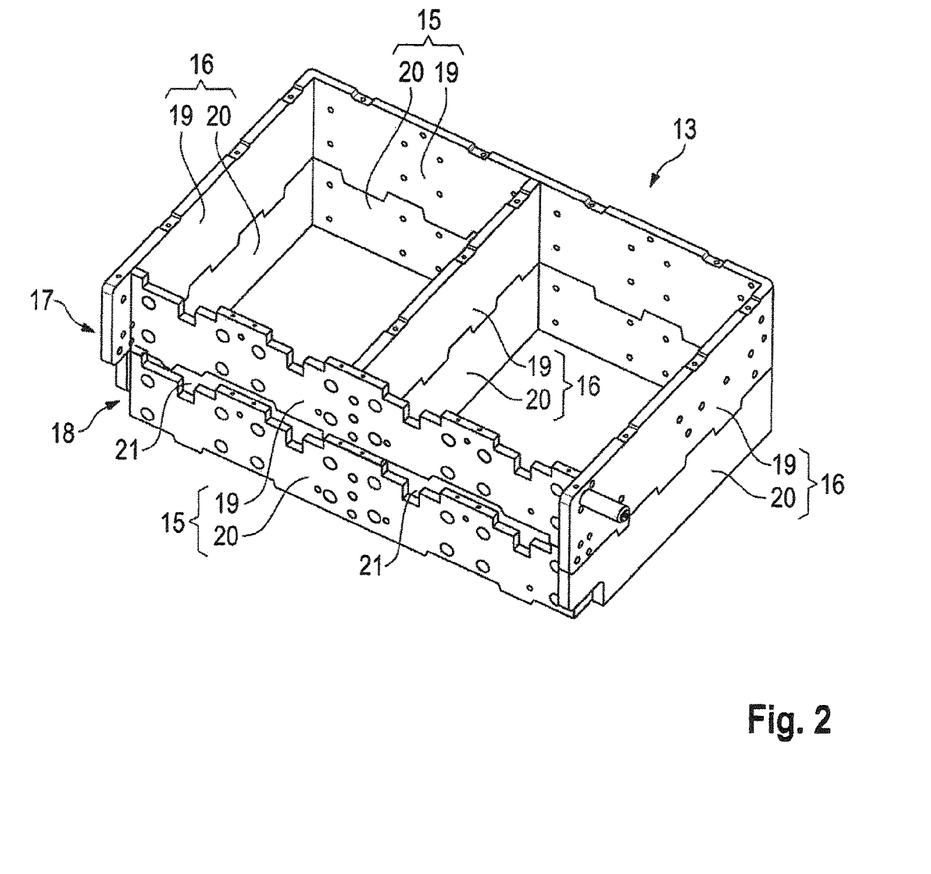
FIG. 2 is a perspective view of a battery housing of the battery of FIG. 1.

As illustrated in the exemplary embodiment of FIG. 2, the three housing walls 16 that extend in the longitudinal direction of the motor vehicle and the rear housing wall 15 that extends transverse to the longitudinal direction of the motor vehicle are defined by housing module walls 19, 20 that interengage in the manner of toothing. The front housing wall 15 also extends transverse to the longitudinal direction of the motor vehicle and also is defined by housing module walls 19, 20. However, the housing module walls 19, 20 of the front housing wall 15 do not interengage in the manner of toothing, but rather have cavities 21 formed between them for leading through cables and/or other supply lines, such as cooling lines, to the battery modules 12 of the motor vehicle battery 10.

The housing walls 15 and 16 of the battery housing 11 are formed by housing module walls 19, 20 interengaging in the manner of toothing and form a W-like or E-like housing structure bounded at the open ends by the housing module walls 19, 20 that do not interengage in the manner of toothing.

Figure 3:
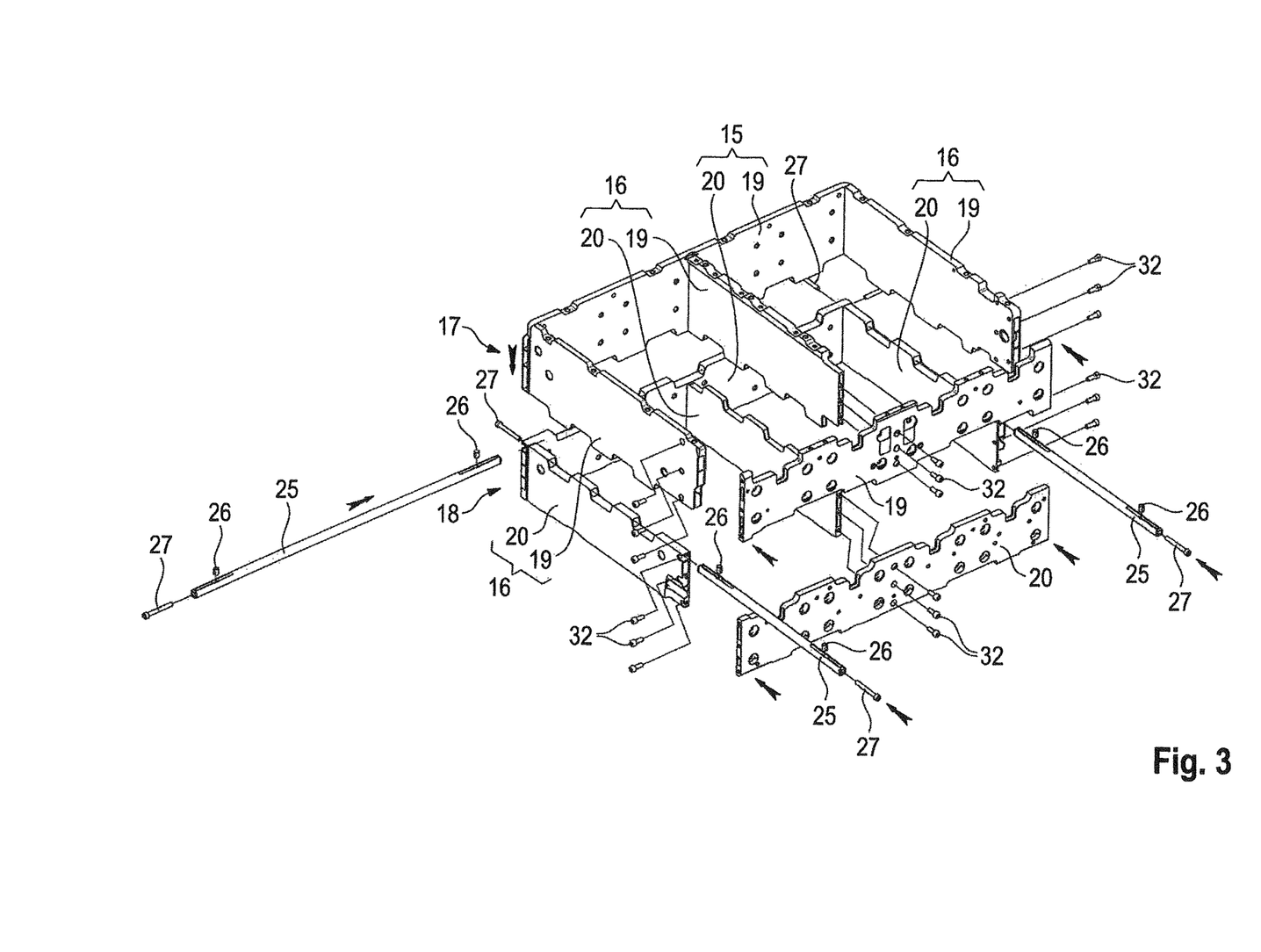
FIG. 3 shows an exploded representation of the battery housing of FIG. 2.
Figure 4:
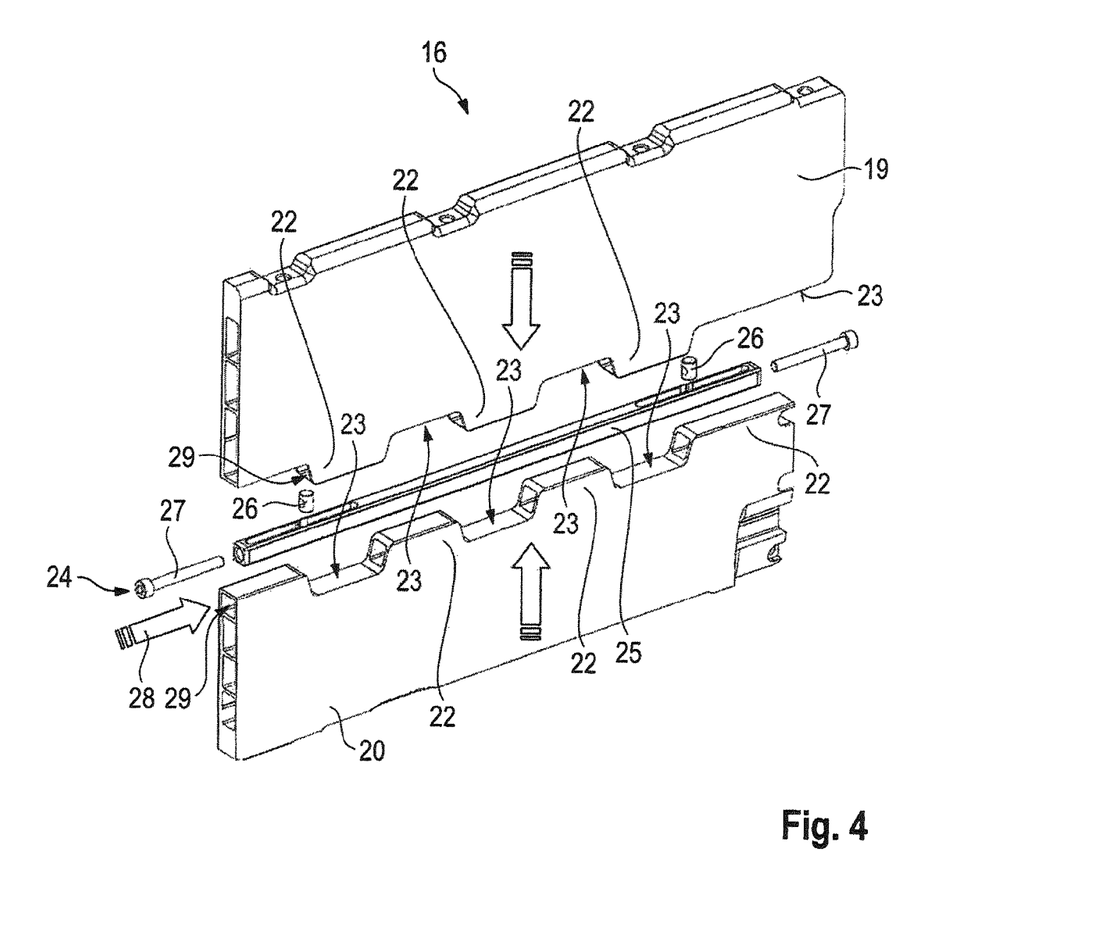
FIG. 4 shows a detail of the exploded representation of FIG. 3 in the region of two housing module walls.

FIGS. 3 and 4 show exploded representations of the inner housing 13 of the battery housing 11. In particular, FIG. 3 shows an exploded representation of two housing module walls 19 and 20 of a housing wall 16 of the inner housing 13, and illustrates that the mutually adjoining housing module walls 19 and 20 interengage in the manner of toothing or interdigitated crenulations so that projections 22 of a housing module wall 19 or 20 engage in recesses 23 of the adjoining housing module wall 20 or 19 to define crenulations in interdigitated engagement.

Figure 5:
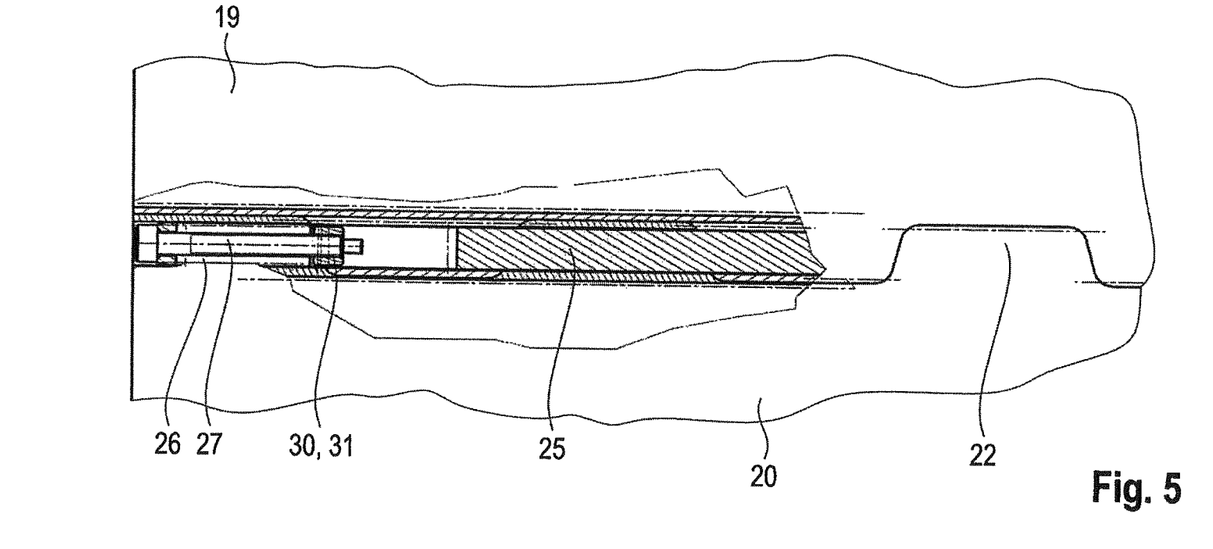
FIG. 5 is a cross section through two interconnected housing module walls.

The housing module walls 19 and 20 that interengage in the manner of toothing are interconnected via clamping bars 24 when the housing modules 17, 18 are positioned above one another. Each clamping bar 24 comprises one clamping rail 25, two clamping bolts 26 and two clamping screws 27. The clamping rail 25 can be pushed in the direction of the arrow 28 into cutouts 29 that extend through the interengaged projections 22 of the mutually adjoining housing module walls 19 and 20, with the clamping bolts 26 being inserted into the clamping rail 25.

Each clamping bolt 26 has a cutout with an internal thread 30. One of the clamping screws 27 interacts with each of the clamping bolts 26 so that each clamping screw 27 extends by way of a portion having an external thread 31 through the cutout of the respective clamping bolt 26, and in the process the external thread 31 of the clamping screw 27 engages with internal threads of the respective clamping bolt 26. The clamping screws 27 then are tightened to interconnect the housing module walls 19, 20 that are plugged into one another and interengage in the manner of toothing.

The housing module walls 19, 20 of the front housing wall 15 that do not interengage in the manner of toothing are connected via screws 32 to the housing module walls 19, 20 of the three housing walls 16 that extend in the longitudinal direction of the motor vehicle (see FIG. 3).

A simple manufacture of a motor vehicle battery 10 is possible with the aid of the invention. This battery can be built up in a modular manner or in layers. A layer of battery modules 12 positioned next to one another is accommodated in the respective housing modules 17, 18 positioned above one another. The motor vehicle battery 10 makes available its operating voltage only when the individual housing modules 17, 18 with the battery modules 12 accommodated thereby are positioned above one another to form the entire motor vehicle battery 10 and are interconnected.

When the housing modules 17, 18 and hence the battery modules 12 accommodated thereby are separated, the electrical voltage made available thereby is considerably reduced by comparison with the total voltage of the motor vehicle battery.

What is claimed is:

1. A motor vehicle battery, comprising:
   a plurality of battery modules;
   a battery housing holding the battery modules, the battery housing having at least an upper housing module formed with upper housing module walls and a lower housing module formed with lower housing module walls, the lower housing module being positioned below the upper housing module, a plurality of the upper housing module walls having downwardly facing lower edges formed with downwardly projecting projections and recesses between the downwardly projecting projections, and a plurality of the lower housing module walls having upwardly facing upper edges formed with upwardly projecting projections and recesses between the upwardly projecting projections, the downwardly projecting projections of the upper housing module being engaged in the recesses between the upwardly projecting projections of the lower housing module to define an engaged state of the upper and lower housing modules, cutouts formed through the upwardly projecting projections and the downwardly projecting projections, the cutouts in the projections of the upper housing module walls being aligned with the cutouts in the projections of the lower housing module walls;
   clamping rails passing through the cutouts for holding the upper and lower housing module walls in the engaged state, slots formed through the clamping rails in proximity to opposite ends thereof and openings extending axially into opposite ends of the clamping rails and communicating with the respective slots;
   clamping bolts mounted respectively in the slots of the clamping rails, each of the clamping bolts having a threaded aperture therein, the threaded aperture being aligned with the respective end of the clamping rail; and
   clamping screws passing respectively into the openings of the clamping rails and being threadedly engaged respectively with the threaded apertures in the respective clamping bolts to hold the upper and lower housing modules together in the engaged state.

2. The motor vehicle battery of claim 1, wherein the battery modules comprise an upper layer of battery modules positioned next to one another and accommodated in the upper housing module and a lower layer of battery modules positioned next to one another and accommodated in the lower housing module.

3. The motor vehicle battery of claim 1, wherein the edges of the housing module walls with the projections and the recesses form W-shaped or E-shaped edge structures.

4. The motor vehicle battery of claim 1, wherein the battery modules form a traction battery of a hybrid vehicle or electric vehicle.

5. The motor vehicle battery of claim 1, wherein the lower housing module has a lower partition wall extending transversely across the lower housing module and the upper housing module has an upper partition wall registered with the lower partition wall.

6. The motor vehicle battery of claim 5, wherein the lower partition wall has an upper edge with upwardly projecting projections and recesses between the upwardly projecting projections, and the upper partition wall has a lower edge with downwardly projecting projections and recesses between the downwardly projecting projections, the projections and recesses of the upper partition wall being interdigitated with the recesses and projections of the lower partition wall.

7. The motor vehicle battery of claim 6, wherein the projections of the lower partition wall have cutouts axially aligned with cutouts formed in the projections of the upper partition wall.

8. The motor vehicle battery of claim 7, wherein the clamping rails comprise a partition wall clamping rail passing through the cutouts of the lower partition wall and the cutouts of the upper partition wall to connect the lower and upper partition walls.

9. The motor vehicle battery of claim 1, wherein the walls of the lower housing module and the upper housing module include opposite outer and inner surfaces, and at least one cavity is formed in at least one of the walls of the lower housing module and the upper housing module and extends between the inner and outer surfaces thereof.

10. A motor vehicle battery, comprising:
a plurality of battery modules; and
a battery housing holding the battery modules, the battery housing having upper and lower vertically stacked housing modules, each of the housing modules being formed from a plurality of housing module walls, each of the housing module walls having upper and lower edges, the upper edges of the housing module walls of the lower housing module being formed with upwardly projecting crenulations and lower edges of the housing module walls of the upper housing module being formed with downwardly projecting crenulations, the upwardly projecting crenulations on the upper edges of the housing module walls of the lower housing module being interdigitated with the downwardly projecting crenulations formed in the lower edges of the housing module walls of the upper housing module to define an interdigitated state, cutouts passing through the interdigitated crenulations of the housing module walls of the upper housing module and the lower housing module, the cutouts in the crenulations of the upper housing module being aligned with the cutouts in the crenulations of the lower housing module;
clamping rails passing through the cutouts for holding the housing module walls of the upper and lower housing modules in the interdigitated state, slots being formed through the clamping rails in proximity to opposite ends thereof and openings extending axially into opposite ends of the clamping rails and communicating with the respective slots;
clamping bolts mounted respectively in the slots of the clamping rails, each of the clamping bolts having a threaded aperture therein, the threaded aperture being aligned with the respective end of the clamping rail; and
clamping screws passing respectively into the openings of the clamping rails and being threadedly engaged respectively with the threaded apertures in the respective clamping bolts to hold the upper and lower housing modules together in the interdigitated state.

11. The motor vehicle battery of claim 10, wherein the battery modules form a traction battery of a hybrid vehicle or electric vehicle.

12. A motor vehicle battery, comprising:
a plurality of battery modules; and
a battery housing holding the battery modules, the battery housing having an upper housing module formed with upper housing module walls having lower edges defining downwardly projecting projections separated by recesses, and a lower housing module formed with lower housing module walls having upper edges formed with upwardly projecting projections separated by recesses, the lower edges of the upper housing module walls being registered with the upper edges of the lower housing module walls so that the downwardly projecting projections on the lower edges of the upper housing module walls nest in the recesses on the upper edges of the lower housing module walls to define a nested state of the upper and lower housing module walls, cutouts extending through the projections on the upper and lower housing module walls; and
clamping rails extending respectively through the cutouts and connecting the lower and upper housing modules, slots being formed through the clamping rails in proximity to opposite ends thereof and openings extending axially into opposite ends of the clamping rails and communicating with the respective slots;
clamping bolts mounted respectively in the slots of the clamping rails, each of the clamping bolts having a threaded aperture therein, the threaded aperture being aligned with the respective end of the clamping rail; and
clamping screws passing respectively into the openings of the clamping rails and being threadedly engaged respectively with the threaded apertures in the respective clamping bolts to hold the upper and lower housing module walls together in the nested state.

13. A motor vehicle battery, comprising:
a plurality of battery modules; and
a battery housing holding the battery modules, the battery housing having at least an upper housing module formed with upper housing module walls and a lower housing module formed with lower housing module walls, each of the walls having an inner surface facing into the respective housing module and an outer surface facing out of the respective housing module, the lower housing module being positioned below the upper housing module, a plurality of the upper housing module walls having downwardly facing lower edges formed with downwardly projecting projections and downwardly open recesses between the downwardly projecting projections, and a plurality of the lower housing module walls having upwardly facing upper edges formed with upwardly projecting projections and upwardly open recesses between the upwardly projecting projections, the projections and the recesses being configured so as not to project inward from the inner surface of the respective wall or outward from the outer surface of the respective wall, the downwardly projecting projections of the upper housing module being engaged in the recesses between the upwardly projecting projections of the lower housing module, cutouts formed through the upwardly projecting projections and the downwardly projecting projections, the cutouts in the projections of the upper housing module walls being aligned with the cutouts in the projections of the lower housing module walls and clamping rails passing through the cutouts for holding the upper and lower housing module walls in an engaged state.

14. The motor vehicle battery of claim 13, wherein the inner and outer surfaces of each of the housing module walls are substantially planar.

15. The motor vehicle battery of claim 14,
wherein the recesses and the projections are configured so that the downwardly projecting projections of the upper housing module are engaged in the recesses between the upwardly projecting projections of the lower housing module by moving the upper and lower housing modules toward one another while keeping the walls of the upper housing module substantially coplanar with corresponding walls of the lower housing module.

16. The motor vehicle battery of claim 13, further comprising
slots formed through the clamping rails in proximity to opposite ends thereof and openings extending axially into opposite ends of the respective clamping rails and communicating with the respective slots.

17. The motor vehicle battery of claim 16, further comprising clamping bolts mounted respectively in the slots of the clamping rails, each of the clamping bolts having a threaded aperture therein, the threaded aperture being aligned with the respective end of the clamping rail; and clamping screws passing into the respective openings of the clamping rails and being threadedly engaged respectively with the threaded apertures in the respectively clamping bolts to hold the engaged walls together.

* * * * *